(12) United States Patent
Taniguchi et al.

(10) Patent No.: US 8,170,113 B2
(45) Date of Patent: May 1, 2012

(54) ENCODER, DATA FILE, ENCODING METHOD, COMPUTER READABLE MEDIUM AND COMPUTER DATA SIGNAL

(75) Inventors: Tomoki Taniguchi, Kanagawa (JP); Taro Yokose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1638 days.

(21) Appl. No.: 11/515,787

(22) Filed: Sep. 6, 2006

(65) Prior Publication Data

US 2007/0140341 A1   Jun. 21, 2007

(30) Foreign Application Priority Data

Dec. 16, 2005   (JP) ................................. 2005-363194

(51) Int. Cl.
 *H04N 7/12* (2006.01)
 *G06K 9/36* (2006.01)

(52) U.S. Cl. .................................. 375/240.24; 382/238

(58) Field of Classification Search ............... 348/411.1, 348/409.1, 410.1, 394.1; 382/239, 238, 253, 382/300, 166, 191, 233, 232, 243, 244, 245, 382/246; 375/240, 240.01, 240.08, 240.12, 375/240.16, 240.24, 240.22, 240.14, 240.02, 375/240.23
See application file for complete search history.

(56) References Cited

U.S. PATENT DOCUMENTS

| | | | | | |
|---|---|---|---|---|---|
| 4,215,374 A | * | 7/1980 | Mizuno | ......................... | 382/238 |
| 5,828,789 A | * | 10/1998 | Yokose et al. | ................ | 382/239 |
| 6,292,587 B1 | * | 9/2001 | Toho | .............................. | 382/238 |
| 6,636,642 B1 | * | 10/2003 | Yokose | ......................... | 382/238 |
| 6,832,004 B2 | * | 12/2004 | So et al. | ......................... | 382/238 |
| RE39,984 E | * | 1/2008 | Kajiwara | ...................... | 382/239 |
| 2003/0194140 A1 | * | 10/2003 | Kimura et al. | ................ | 382/238 |
| 2006/0022848 A1 | * | 2/2006 | Nomura | .......................... | 341/50 |

FOREIGN PATENT DOCUMENTS

JP   A 2000-350215   12/2000

* cited by examiner

*Primary Examiner* — Behrooz Senfi
(74) *Attorney, Agent, or Firm* — Oliff & Berridge, PLC

(57) ABSTRACT

An encoder includes a prediction unit and a code generation unit. The prediction unit predicts target data and judges whether prediction is right or wrong. When the prediction unit judges that consecutive predictions for respective target data are wrong, the code generation unit generates coded data including symbols corresponding to the respective target data for which the consecutive wrong predictions are made, using a code representing number of the consecutive predictions judged as wrong.

10 Claims, 7 Drawing Sheets

FIG. 2A RELATED ART
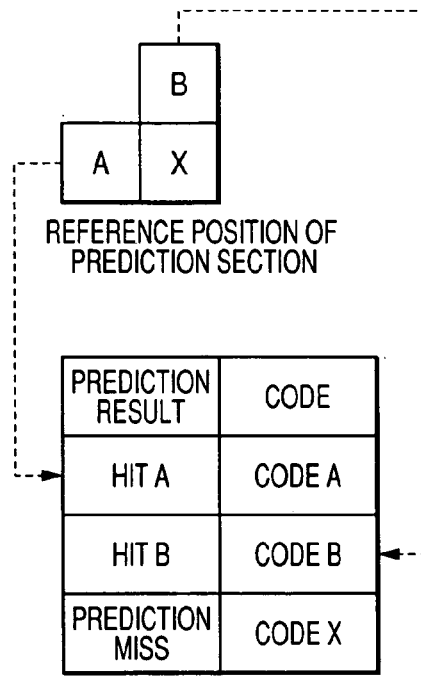
REFERENCE POSITION OF PREDICTION SECTION
FIG. 2B RELATED ART
FIG. 2C RELATED ART
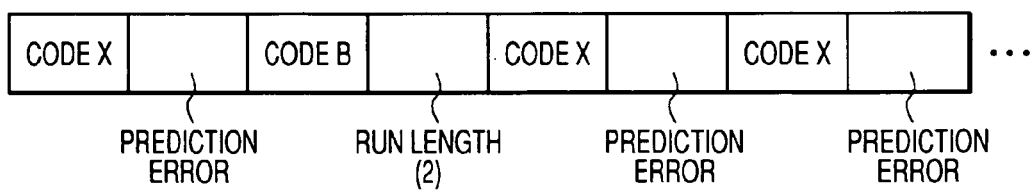
EXAMPLE OF CODED DATA

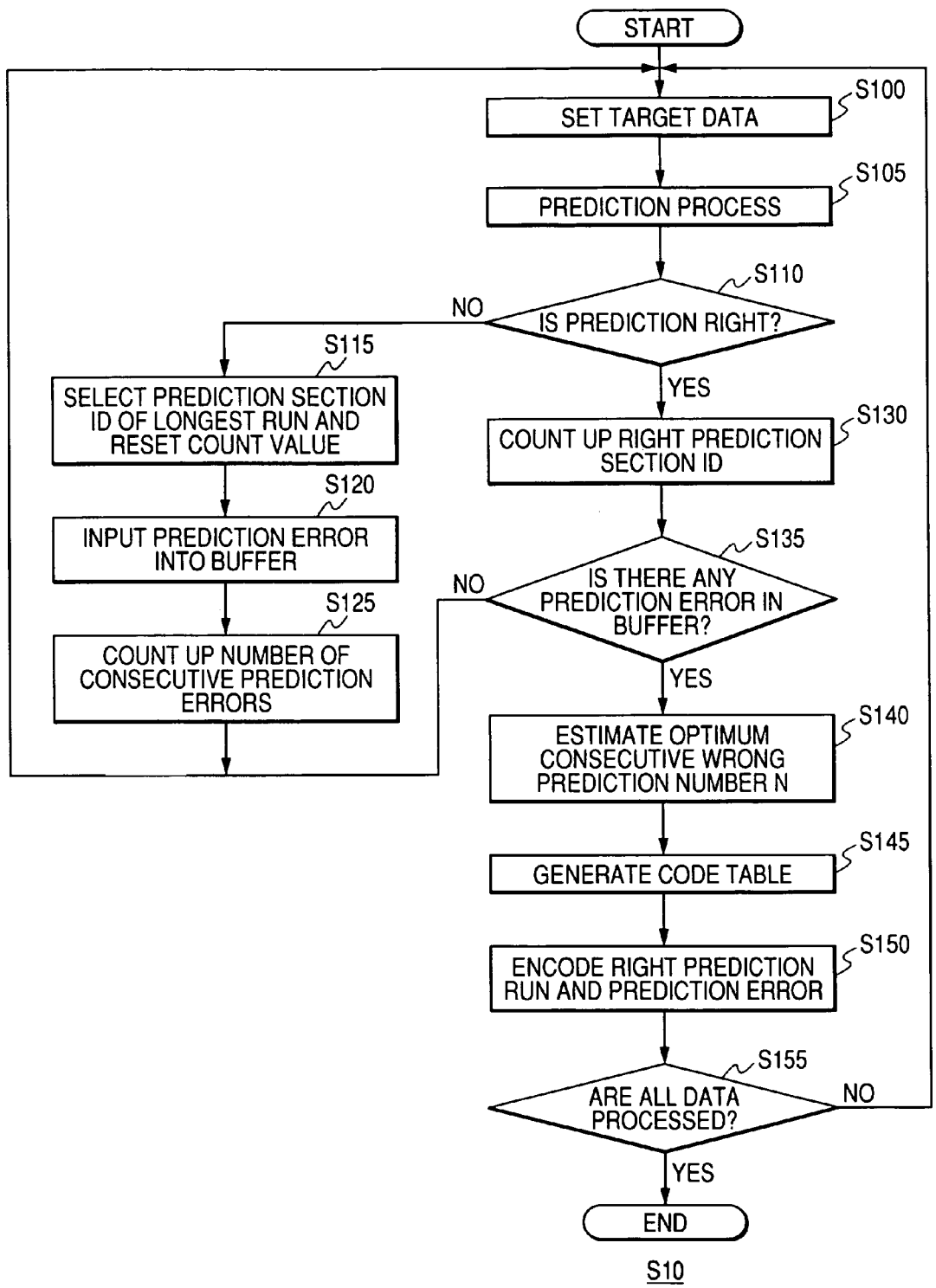

NUMBER OF CONSECUTIVE WRONG PREDICTIONS

CODED DATA 7

ENCODER, DATA FILE, ENCODING METHOD, COMPUTER READABLE MEDIUM AND COMPUTER DATA SIGNAL

BACKGROUND

Technical Field

The invention relates to an encoding method for encoding data.

SUMMARY

According to an aspect of the invention, an encoder includes a prediction unit and a code generation unit. The prediction unit predicts target data and judges whether prediction is right or wrong. When the prediction unit judges that consecutive predictions for respective target data are wrong, the code generation unit generates coded data including symbols corresponding to the respective target data for which the consecutive wrong predictions are made, using a code representing number of the consecutive predictions judged as wrong.

BRIEF DESCRIPTION OF THE DRAWINGS

Exemplary embodiments of the invention will be described in detail based on the following figures, wherein:

FIGS. 2A to 2C are views for explaining the encoding process based on the encoding program 9;

FIG. 6 is a flow chart of an encoding process (S10) based on the encoding program 5 (FIG. 4);

DETAILED DESCRIPTION

In a predictive encoding process, a symbol generated when prediction is right is different from a symbol generated when prediction is wrong. For example, in a run-length encoding method, continuous hit length (run) and continuous data values (such as pixel values) are used as a symbol to be encoded when prediction is right, whereas a data value itself is used as a symbol to be encoded when prediction is wrong. An identifier is used for discriminating between right prediction and wrong prediction.

Figure 1:
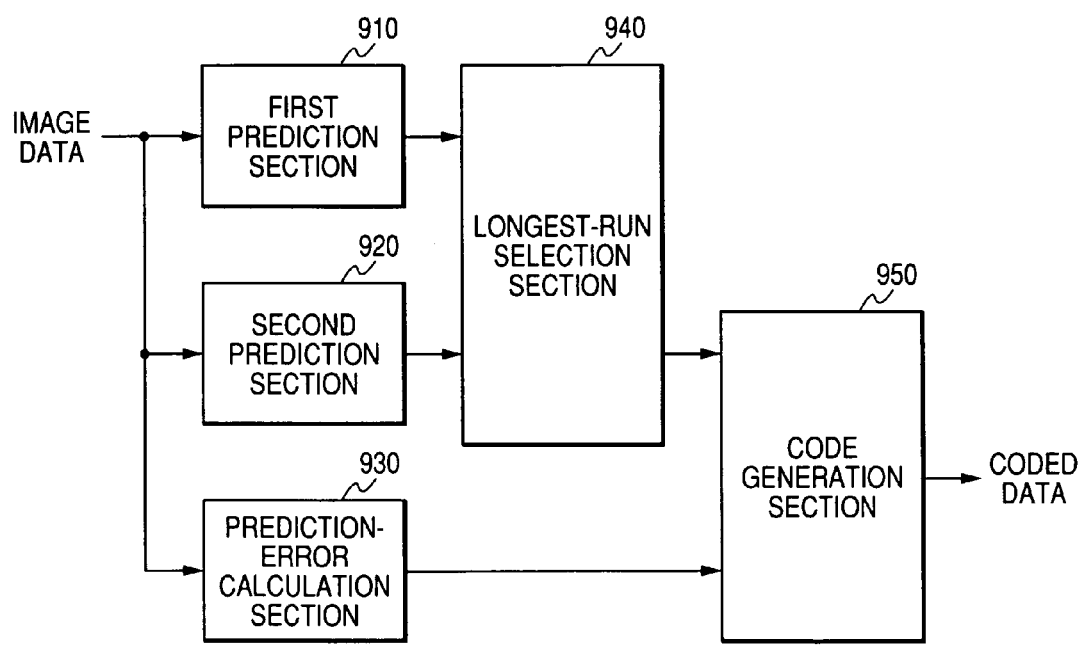
FIG. 1 is a diagram showing the functional configuration of an encoding program 9 for performing an encoding process by a predictive encoding method. The encoding program can be embedded within a computer-readable storage medium or within a carrier wave.

FIG. 1 is a diagram showing the functional configuration of an encoding program 9 for performing an encoding process by a predictive encoding method.

FIGS. 2A to 2C are views for explaining the encoding process based on the encoding program 9.

As shown in FIG. 1, the encoding program 9 has a first prediction section 910, a second prediction section 920, a prediction-error calculation section 930, a longest-run selection section 940, and a code generation section 950.

In the encoding program 9, the first and second prediction sections 910 and 920 use existing prediction methods different from each other so that each of the first and second prediction sections 910 and 920 predicts the data value of a target data and outputs a result of judgment as to whether the predicted value is coincident with the data value or not, to the longest-run selection section 940. Specifically, as shown in FIG. 2A, when the first prediction section 910 is to predict the pixel value of a target pixel X, the first prediction section 910 regards the pixel value of a reference pixel A as a predicted value by referring to the pixel A just in front of the target pixel X. When the second prediction section 920 is to predict the pixel value of the target pixel X, the second prediction section 920 regards the pixel value of a reference pixel B as a predicted value by referring to the pixel B (adjacent pixel in a sub scanning direction of an image) just above the target pixel X.

The prediction-error calculation section 930 predicts the data value of the target value by using an existing prediction method, calculates the difference between the predicted value and the data value and outputs the calculated difference (i.e. prediction error) to the code generation section 950. Specifically, when the prediction-error calculation section 930 is to predict the pixel value of the target pixel X, the prediction-error calculation section 930 calculates prediction error by regarding the pixel value of the pixel A just in front of the target pixel X as a predicted value.

The longest-run selection section 940 selects the longest run from the number of continuous hits (hereinafter referred to as "run") in one of the prediction portions (i.e. either the first prediction section or the second prediction section) on the basis of the results of judgments (as to whether prediction is right or not) due to the first and second prediction sections 910 and 920. The longest-run selection section 940 outputs the selected run and identification information of the prediction portion (hereinafter referred to as "prediction section ID") to the code generation section 950.

When prediction due to either prediction portion (the first prediction section 910 or the second prediction section 920) is right, the code generation section 950 encodes a symbol (e.g. longest run) corresponding to right prediction. When predictions made by both prediction portions 910 and 920 are wrong, the code generation section 950 encodes a symbol (e.g. prediction error) corresponding to wrong prediction. Specifically, as shown in FIG. 2B, identifiers (code A and code B) indicating right prediction and an identifier (code X) indicating wrong prediction are related to prediction results (as to whether prediction due to either prediction portion is right or whether predictions made by both prediction portions are wrong) in advance. The code generation section 950 performs encoding by adding a corresponding identifier to the longest run input from the longest-run selection section 940 or to the prediction error input from the prediction-error calculation section 930.

As shown in FIG. 2C, the coded data generated thus contains identifiers (such as code X, and code B), and symbols (such as prediction error, and run length).

In the aforementioned encoding program 9, as shown in FIG. 2C, an identifier ("code X" in FIG. 2C) indicating wrong prediction is added whenever prediction is wrong. For this reason, if such data that wrong prediction occurs frequently is input (e.g. if optically read image data is input), identifiers indicating wrong prediction bring an overhead cost.

Therefore, an encoder 2 according to this exemplary embodiment extends information sources up to consecutive wrong prediction number data so that one identifier is added to a group of symbols corresponding to consecutive wrong predictions.

More specifically, the encoder 2 estimates an optimum number of consecutive wrong predictions (hereinafter referred to as "optimum consecutive wrong prediction number") for efficient encoding on the basis of the frequency in occurrence of wrong prediction and extends the information sources up to the estimated optimum consecutive wrong prediction number. That is, the encoder 2 encodes the consecutive wrong prediction number by referring to a code table designed in accordance with data of the optimum consecutive wrong prediction number and uses the coded consecutive wrong prediction number as an identifier to be added to a group of symbols corresponding to consecutive wrong predictions.

[Hardware Configuration]

First, the hardware configuration of the encoder 2 according to this exemplary embodiment will be described.

Figure 3:
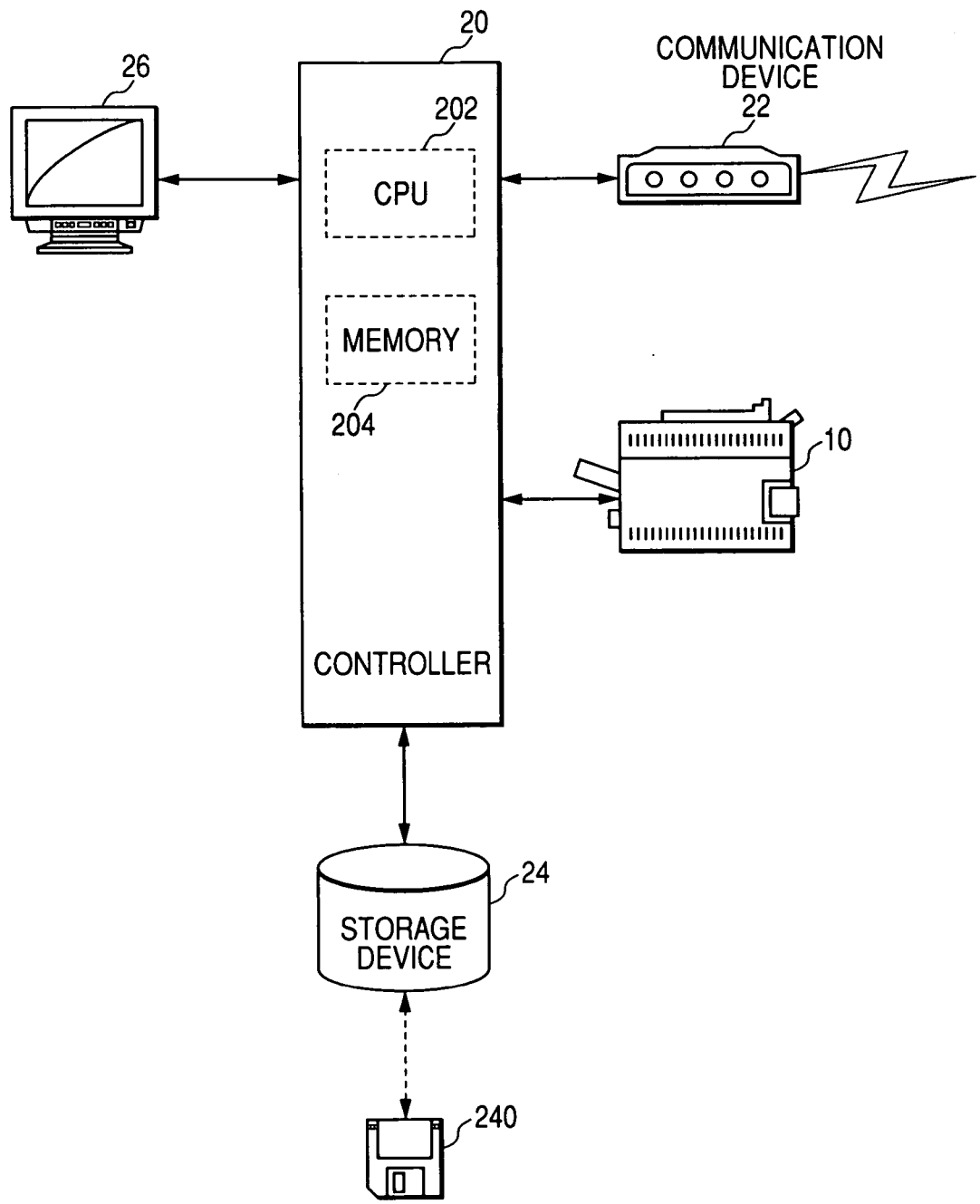
FIG. 3 is a diagram showing the hardware configuration of the encoder 2 using an encoding method according to an exemplary embodiment of the invention.

FIG. 3 is a diagram showing the hardware configuration of the encoder 2 using the encoding method according to the invention, with a controller 20 as a key device.

As shown in FIG. 3, the encoder 2 has a controller 20, a communication device 22, a storage device 24, and a user interface device (UI device) 26. The controller 20 includes a CPU 202, and a memory 204. The storage device 24 includes an HDD, and a CD device. The UI device 26 includes an LCD or CRT display device, and a keyboard or touch panel.

For example, the encoder 2 is a processor provided in a printer 10. The encoder 2 acquires image data through the communication device 22 or the storage device 24 and encodes the acquired image data.

[Encoding Program]

Figures 4, 5:
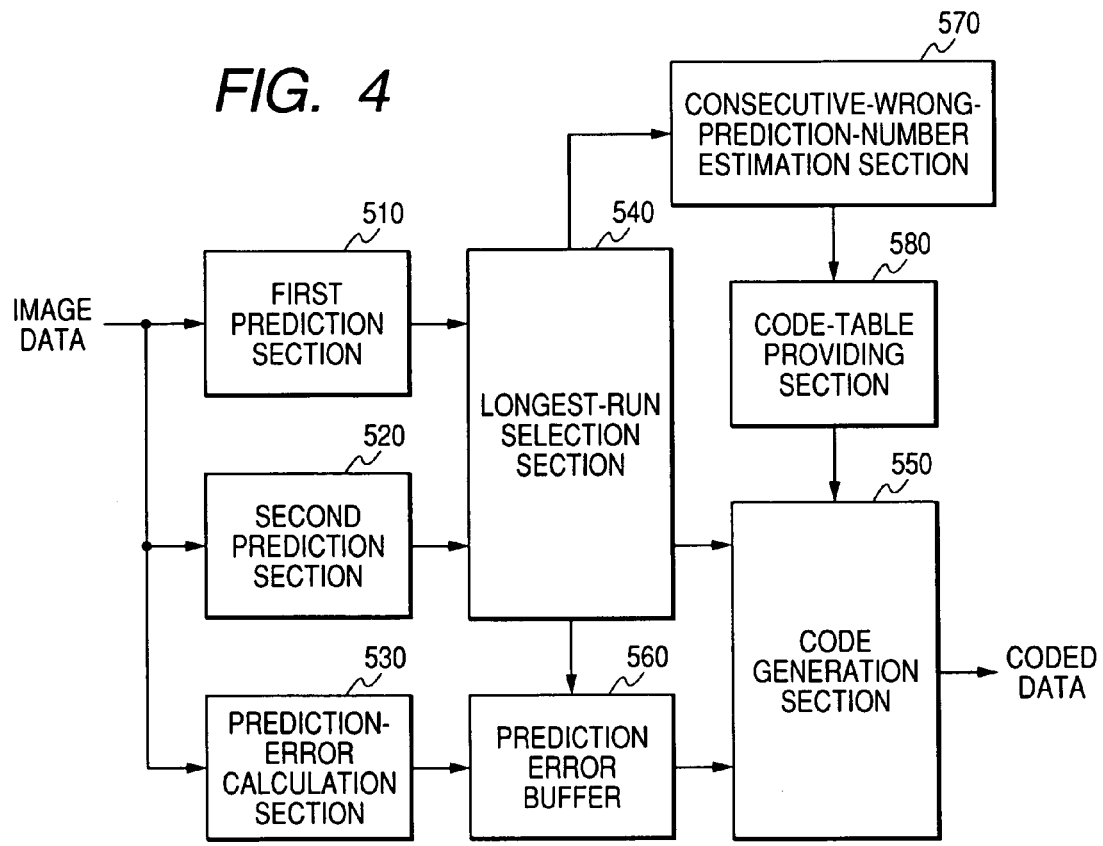
FIG. 4 is a diagram showing the functional configuration of an encoding program 5 executed by the controller 20 (FIG. 3) for implementing the encoding method according to the exemplary embodiment of the invention.
FIG. 5 is a view showing a code table 582 provided by a code-table providing section 580.

FIG. 4 is a diagram showing the functional configuration of an encoding program 5 executed by the controller 20 (FIG. 3) for implementing the encoding method according to the invention.

As shown in FIG. 4, the encoding program 5 has a first prediction section 510, a second prediction section 520, a prediction-error calculation section 530, a longest-run selection section 540, a code generation section 550, a prediction error buffer 560, a consecutive-wrong-prediction-number estimation section 570 and a code-table providing section 580.

Incidentally, in this exemplary embodiment, the case where image data is encoded will be described as a specific example.

In the encoding program 5, the first and second prediction sections 510 and 520 (functioning as a prediction unit) use existing prediction methods different from each other so that each of the first and second prediction sections 510 and 520 predicts a data value of a target data and outputs a result of judgment as to whether the predicted value is coincident with the data value or not, to the longest-run selection section 540.

In this exemplary embodiment, as shown in FIG. 2A, when the first prediction section 510 is to predict a pixel value of a target pixel X, the first prediction section 510 regards a pixel value of a reference pixel A as a predicted value by referring to the pixel A just in front of the target pixel X. When the second prediction section 520 is to predict the pixel value of the target pixel X, the second prediction section 520 regards a pixel value of a reference pixel B as a predicted value by referring to the pixel B (adjacent pixel in a sub scanning direction of an image) just above the target pixel X.

Although in this exemplary embodiment, the mode where two prediction methods (prediction portions) are used will be described as a specific example, a single prediction method may be used or three or more prediction methods may be used.

The prediction-error calculation section 530 predicts the data value of the target value by using an existing prediction method, calculates a difference between the predicted value and the data value and outputs the calculated difference (i.e. prediction error) to the prediction error buffer 560.

When the pixel value of a target pixel X is to be predicted, the prediction-error calculation section 530 of this exemplary embodiment calculates prediction error by regarding the pixel value of the pixel A just in front of the target pixel X as a predicted value.

The longest-run selection section 540 selects the longest run from the number of continuous hits (hereinafter referred to as "run") in one of the prediction sections (i.e. either the first prediction section 510 or the second prediction section 520) on the basis of the results of judgments (as to whether prediction is right or not) made by the first and second prediction sections 510 and 520. The longest-run selection section 540 outputs the selected run and identification information of the prediction section (hereinafter referred to as "prediction section ID") to the code generation section 550.

The longest-run selection section 540 also outputs the results of judgments input (as to whether prediction is right or not) from the first and second prediction sections 510 and 520 to the prediction error buffer 560 and the consecutive-wrong-prediction estimation section 570.

The prediction error buffer 560 judges whether a wrong prediction state continues or not, on the basis of the judgment result (as to whether prediction made by either the first prediction section 510 or the second prediction section 520 is right or not) input from the longest-run selection section 540. When the wrong prediction state continues (e.g., when wrong prediction pixels are present continuously in this exemplary embodiment), prediction error input from the prediction-error calculation section 530 is stored in the prediction-error buffer 560. When the wrong prediction state stops (e.g., when prediction made by either the first prediction section 510 or the second prediction section 520 is right in this exemplary embodiment), prediction error stored in the prediction-error buffer 560 is output to the code generation section 550.

The consecutive-wrong-prediction-number estimation section 570 (functioning as an upper-limit decision unit) holds the judgment result (i.e. information indicating the past prediction state) input from the longest-run selection section 540. The consecutive-wrong-prediction-number estimation section 570 calculates the probability of occurrence of wrong prediction on the basis of the held judgment results.

The consecutive-wrong-prediction-number estimation section 570 also calculates an optimum number of consecutive wrong predictions (i.e. optimum consecutive wrong prediction number) for encoding on the basis of the calculated probability of occurrence of wrong prediction. The consecutive-wrong-prediction-number estimation section 570 outputs the calculated optimum consecutive wrong prediction number to the code-table providing section 580.

In this exemplary embodiment, because a dominant symbol corresponds to wrong prediction when a photographic image is input, the input image is assumed to be a memoryless information source. The consecutive-wrong-prediction-number estimation section 570 calculates the optimum consecutive wrong prediction number N on the basis of the probability P of occurrence of wrong prediction in accordance with the following expression.

$$N=\log(0.5)/\log(P)$$

Although this exemplary embodiment has been described on the case where the optimum consecutive wrong prediction number N is calculated on the basis of the probability P of occurrence of wrong prediction by use of the aforementioned expression on the assumption that the input image is a memoryless information source, the invention is not limited thereto. For example, another estimation method may be used or the optimum consecutive wrong prediction number N may be regarded as a fixed value.

The code-table providing section 580 (functioning as a code assignment unit) decides a code table to be applied, on the basis of the optimum consecutive wrong prediction number input from the consecutive-wrong-prediction-number estimation section 570. The code-table providing section 580 provides the decided code table to the code generation section 550. The decided code table contains codes in the same coding space, which are assigned to identifiers each indicating right prediction and identifiers each indicating the number of consecutive wrong predictions.

The code-table providing section 580 may select a code table corresponding to the optimum consecutive wrong prediction number from a plurality of code tables prepared in advance and provide the selected code table to the code generation section 550. Alternatively, the code-table providing section 580 may generate a code table dynamically on the basis of the optimum consecutive wrong prediction number and provide the generated code table to the code generation section 550.

In this exemplary embodiment, the code-table providing section 580 generates a Huffman code table by using the consecutive wrong prediction numbers (1 to N) up to the optimum consecutive wrong prediction number N calculated by the consecutive-wrong-prediction-number estimation section 570, right prediction made by the first prediction section and right prediction made by the second prediction section as information sources (N+1 information sources in total). As shown in FIG. 5, the generated code table contains "code A" as an identifier indicating that prediction made by the first prediction section 510 is right, "code B" as an identifier indicating that prediction made by the second prediction section 520 is right, and "code X1" as an identifier indicating that predictions made by both prediction portions 510 and 520 are wrong (i.e. identifier indicating the fact that prediction error should be applied). The code table further contains "code X2" as an identifier indicating that two prediction errors continue, "code X3" as an identifier indicating that three prediction errors continue, and "code XN" as an identifier indicating that N prediction errors continue. That is, in comparison with the code table shown in FIG. 2B, the code table of this exemplary embodiment is generated so that information sources from "error continuity 2" to "error continuity N" are added.

The code generation section 550 (functioning as a code generation unit) encodes the longest run (symbol corresponding to right prediction) input from the longest-run selection section 540 or the prediction error (symbol corresponding to wrong prediction) input from the prediction error buffer 560, by using the code table provided by the code-table providing section 580.

When prediction made by either prediction section (the first prediction section 510 or the second prediction section 520) is right, the code generation section 550 of this exemplary embodiment gives "code A" or "code B" shown in FIG. 5 to the longest run. When predictions made by both prediction sections 510 and 520 are wrong, the code generation section 550 of this exemplary embodiment gives a code (any one of "code X1" to "code XN") corresponding to the number of consecutive wrong predictions, to the prediction error.

Accordingly, when predictions are wrong continuously, the code generation section 550 selects a code corresponding the number of wrong predictions and gives the selected code to consecutive prediction errors. Incidentally, when the number of consecutive prediction errors is larger than the optimum consecutive wrong prediction number N, the code generation section 550 divides a row of consecutive prediction errors into parts halfway and gives codes corresponding to the numbers of consecutive wrong predictions to the divided prediction error parts, respectively. When the number of consecutive prediction errors is larger than the optimum consecutive wrong prediction number N, the code generation section 550 may give "code X1" corresponding to "wrong prediction" to each of prediction errors in the row of consecutive prediction errors.

[Overall Operation]

The overall operation of the encoder 2 (encoding program 5) will be described next.

FIG. 6 is a flow chart of an encoding process (S10) based on the encoding program 5 (FIG. 4).

As shown in FIG. 6, in step 100 (S100), when image data is input from the outside, the encoding program 5 (FIG. 4) sets a target pixel X in scanning order in the input image data. The "target pixel" means a pixel to be processed.

In step 105 (S105), the first prediction section 510 reads a pixel value of a reference pixel A corresponding to the target pixel X as shown in FIG. 2A, and compares the read pixel value of the reference pixel A, which is a predicted value, with a pixel value of the target pixel X. When the predicted value (the pixel value of the reference pixel A) matches the pixel value of the target pixel X, the first prediction section 510 outputs a prediction section ID for self-identification to the longest-run selection section 540.

Similarly, the second prediction section 520 reads a pixel value of a reference pixel B as shown in FIG. 2A, and compares the read pixel value of the reference pixel B, which is a predicted value, with the pixel value of the target pixel X. When the predicted value (the pixel value of the reference pixel B) matches the pixel value of the target pixel X, the second prediction section 520 outputs a prediction section ID for self-identification to the longest-run selection section 540.

The prediction-error calculation section 530 reads the pixel value of the reference pixel A shown in FIG. 2A and outputs to the prediction error buffer 560 a difference between the read pixel value of the reference pixel A and the pixel value of the target pixel X as prediction error.

In step 110 (S110), the longest-run selection section 540 judges whether prediction made by either prediction section is right or wrong, on the basis of whether the prediction section ID is acquired from either the first prediction section 510 or the second prediction section 520. The longest-run selection section 540 outputs a result of judgment (as to whether prediction is right or not) to the consecutive-wrong-prediction estimation section 570 and the prediction error buffer 530.

When prediction made by either the first prediction section 510 or the second prediction section 520 is right, the encoding program 5 goes to step S130. When predictions made by both the first prediction section 510 and the second prediction section 520 are wrong, the encoding program 5 goes to step S115.

In step 115 (S115), when predictions made by both the first prediction section 510 and the second prediction section 520 are wrong, the longest-run selection section 540 selects the longest run by referring to a counted value (i.e. run corresponding to right prediction) of a counter corresponding to each prediction section ID and outputs the selected longest run (prediction section ID and run length of the longest run) to the code generation section 550. Then, the longest-run selection section 540 resets the counter corresponding to each prediction section ID.

That is, the encoding program 5 of this exemplary embodiment counts runs (numbers of consecutive right predictions) in the respective prediction sections until predictions made by both the prediction portions become wrong. When predictions made by both the prediction portions become wrong, the encoding program 5 rearranges the numbers of consecutive right predictions (runs).

In step 120 (S120), when the fact that predictions made by both the prediction portions are wrong is input from the longest-run selection section 540 into the prediction error buffer 560, the prediction error input from the prediction-error calculation section 530 is stored into the prediction error buffer 560.

That is, when prediction is right, the prediction error buffer 560 of this exemplary embodiment discards the prediction error input from the prediction-error calculation section 530. Only when predictions made by both the prediction portions are wrong, the prediction error buffer 560 holds the input prediction error.

In step 125 (S125), the prediction error buffer 560 counts up number of stored prediction errors when the input prediction error is stored in the prediction error buffer 560.

The encoding program 5 then returns to the step S100 and processes a next target pixel X.

In step 130 (S130), when a prediction section ID is input from each or either of the first prediction section 510 and the second prediction section 520, the longest-run selection section 540 counts up the count value (i.e. run) of the counter corresponding to the input prediction section ID.

In step 135 (S135), the encoding program 5 judges whether prediction error is stored in the prediction error buffer 560. When there is any prediction error stored, the encoding program 5 goes to step S140 to encode the stored prediction error. When there is no prediction error stored, the encoding program 5 goes back to the step S100 to process the next target pixel X.

That is, the encoding program 5 of this exemplary embodiment goes to a prediction-error-string encoding process (S140, etc.) when prediction error continuity stops.

In step 140 (S140), the consecutive-wrong-prediction estimation section 570 calculates the probability P of occurrence of wrong prediction on the basis of the judgment results (as to whether prediction is right or not) input from the longest selection portion 540. The consecutive-wrong-prediction estimation section 570 calculates an optimum consecutive wrong prediction number N on the basis of the calculated probability P of occurrence of wrong prediction and outputs the calculated optimum consecutive wrong prediction number N to the code-table providing section 580.

That is, the encoding program 5 of this exemplary embodiment calculates the optimum consecutive wrong prediction number N dynamically.

In step 145 (S145), the code-table providing section 580 generates a code table 582 shown in FIG. 5 in accordance with the optimum consecutive wrong prediction number N input from the consecutive-wrong-prediction estimation section 570. The code-table providing section 580 outputs the generated code table 582 to the code generation section 550. That is, codes are assigned to identifiers ("hit A" and "hit B" shown in FIG. 5) indicating that prediction is right, an identifier ("prediction miss" shown in FIG. 5) indicating that there is a single prediction error, and identifiers ("error continuity 2" to "error continuity N" shown in FIG. 5) indicating that there are plural prediction errors, respectively.

In step 150 (S150), the code generation section 550 performs entropy coding of the longest run (generated in S115) input from the longest-run selection section 540.

The code generation section 550 also selects a code ("code A" or "code B" in FIG. 5) corresponding to the prediction section ID of the prediction section having the longest run from the code table 582 input from the code-table providing section 580. The code generation section 550 outputs the selected code to the outside (e.g. the storage device 24 in FIG. 3) while associating the selected code with the coded longest run.

Then, upon reception of the message of wrong prediction from the longest-run selection section 540, the prediction error buffer 560 outputs the stored prediction errors and the number of errors to the code generation section 550.

The code generation section 550 performs entropy coding of the prediction errors input from the prediction error buffer 560. The code generation section 550 further selects a code (any one of codes X1 to XN shown in FIG. 5) corresponding to the number of consecutive prediction errors from the code table 582 input from the code-table providing section 580 in accordance with the number of consecutive prediction errors input from the prediction error buffer 560. The code generation section 550 outputs the selected code to the outside (e.g. the storage device 24 in FIG. 3) while associating the selected code with the coded prediction error.

In step 155 (S155), the encoding program 5 judges whether or not processing is completed for all pixels contained in the image data. When there is any unprocessed pixel, the encoding program 5 goes back to the step S100 to process the next target pixel X. When processing is completed for all pixels, the encoding process (S10) is terminated.

As described above, the encoder 2 according to this exemplary embodiment estimates the optimum consecutive wrong prediction number N for efficient encoding on the basis of the frequency in occurrence of wrong prediction and extends information sources up to the optimum consecutive wrong prediction number N.

Consecutive numbers (2 to N) not larger than the consecutive wrong prediction number N are encoded on the basis of the code table designed in accordance with the optimum consecutive wrong prediction number N. The coded numbers are used as prediction error identifiers. As a result, an efficient encoding process can be achieved.

Figure 7A:
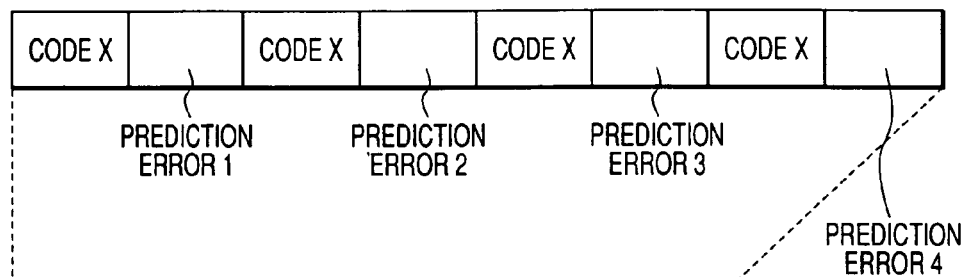
FIGS. 7A to 7C are views for explaining coding efficiency of the encoding program 5.
Figure 7B:
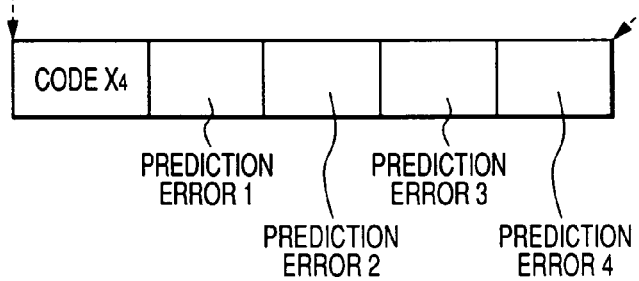

If an identifier (code X) indicating wrong prediction is given to each wrong prediction in the case where wrong predictions continue as shown in FIG. 7A, this may cause an overhead cost. In the exemplary embodiment, a single identifier "code X4" (entropy code indicating the number of consecutive wrong predictions) is, however, given to plural consecutive prediction errors (wrong prediction data) as shown in FIG. 7B. As a result, a more efficient encoding process can be achieved. Incidentally, when prediction is right, a code ("code A" or "code B") indicating right prediction is given to the run length (right prediction data) as shown in FIG. 2C.

Figure 7C:
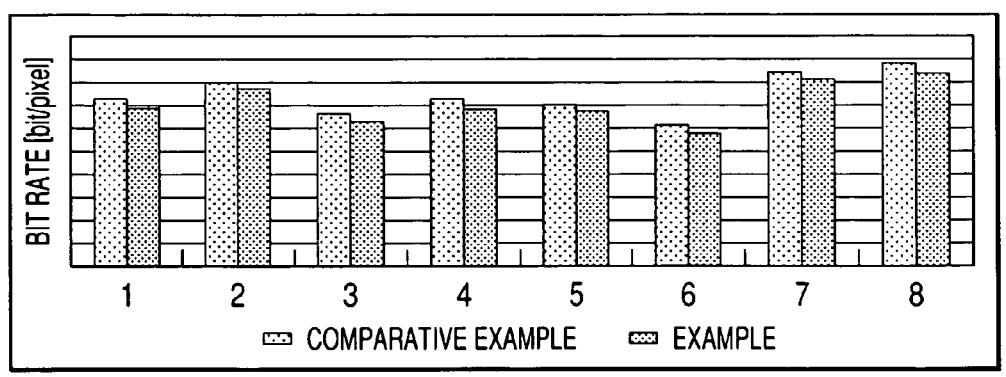

For example, in comparison between the case where sample images 1 to 8 are encoded by the encoding program 9 shown in FIG. 1 and the case where sample images 1 to 8 are encoded by the encoding program 5 shown in FIG. 4, it is understood that the encoding program 5 shown in FIG. 4 can achieve more efficient encoding process because the encoding program 5 is lower in bit rate as shown in FIG. 7C.

[Modifications]

Although a predictive coding method using plural prediction methods has been described in the exemplary embodiment as shown in FIGS. 2A to 2C, the invention is not limited thereto. For example, the invention may be applied to a run-length coding method using a single prediction method.

Figure 8A:
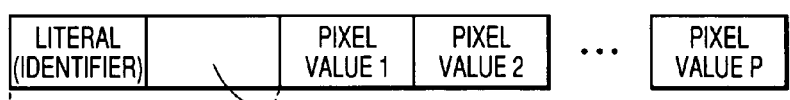
FIGS. 8A to 8C are views showing coded data (data file) in the case where another exemplary embodiment of the invention is applied to a run-length coding method.
Figure 8B:
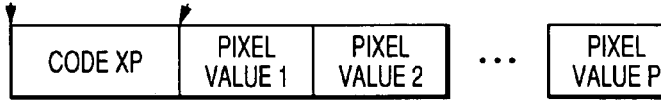
Figure 8C:

FIGS. 8A to 8C are views showing coded data 7 (data file) in the case where another exemplary embodiment of the invention is applied to a run-length coding method.

As shown in FIG. 8A, in a general run-length coding method, when prediction is wrong (i.e. when target data does not match data just in front of the target data), an identifier ("literal" in FIG. 8A) indicating wrong prediction and the number of consecutive wrong predictions are output before pixel values ("pixel value 1" to "pixel value P" in FIG. 8A) of wrong prediction pixels are output.

Another exemplary embodiment of the invention is applied to the run-length coding method as follows. As shown in FIG. 8B, when the number of consecutive wrong predictions is not larger than the optimum consecutive wrong prediction number N, a code (entropy code) indicating the number of consecutive wrong predictions is output before pixel values (wrong prediction data) of wrong prediction pixels are output.

It is noted that when prediction is right, right prediction data composed of the number of continuous right predictions (run length) and the pixel value thereof is generated as shown in FIG. 8C.

In another exemplary embodiment of the invention, the coded data 7 contains right prediction data composed of the run length and the pixel value thereof, and a code indicating the number of consecutive wrong predictions and wrong prediction pixel values. Accordingly, because the "literal" and the "number of consecutive wrong predictions" shown in FIG. 8A are collected into "code XP" shown in FIG. 8B, more efficient encoding process can be achieved. Moreover, because the "code XP" is decided on the basis of the optimum wrong prediction number in the same manner as described above, coding efficiency is high.

In addition, the invention can be applied to another predictive coding method.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An encoder comprising:
   a prediction unit that predicts target data and judges whether prediction is right or wrong;
   a code generation unit that, when the prediction unit judges that consecutive predictions for respective target data are wrong, generates coded data that includes a single identifier code that identifies a number of consecutive wrong predictions followed by symbols corresponding to the respective target data for which the consecutive wrong predictions are made; and
   a code assignment unit that outputs to the code generation unit a table in which different codes are assigned to respective numbers of consecutive predictions judged as wrong, which are equal to or less than an upper limit value, wherein:
   the code generation unit generates the code data including (i) the symbols corresponding to the respective target data for which the consecutive wrong predictions are made and (ii) a code assigned to the number of the consecutive wrong predictions for the respective target data, in accordance with the table output from the code assignment unit.

2. The encoder according to claim 1, wherein the upper limit value is equal to or larger than 2.

3. The encoder according to claim 1, wherein the code assignment unit stores the table, which is prepared in advance.

4. The encoder according to claim 1, further comprising:
   an upper-limit decision unit that decides the upper limit value according to how frequently the prediction unit judges that prediction is wrong, wherein:
   the code assignment unit generates the table in which the different codes are assigned to numbers of consecutive predictions judged as wrong, which are equal to or less than the upper limit value.

5. The encoder according to claim 1, wherein the code assignment unit outputs the table in which difference codes in the same coding space to (i) information indicating that prediction made by the prediction unit is right and (ii) the respective numbers of consecutive predictions judged as wrong, which are equal to or less than the upper limit value.

6. The encoder according to claim 4, wherein the code assignment unit generates the table in which difference codes in the same coding space to (i) information indicating that prediction made by the prediction unit is right and (ii) the respective numbers of consecutive predictions judged as wrong, which are equal to or less than the upper limit value.

7. An encoding method performed by a processor comprising:
   predicting target data;
   judging whether the predicting is right or wrong;
   when it is judged that consecutive predictions for respective target data are wrong, generating coded data that includes a single identifier code that identifies a number of consecutive wrong predictions followed by symbols corresponding to the respective target data for which the consecutive wrong predictions are made; and
   outputting a table in which different codes are assigned to respective numbers of consecutive predictions judged as wrong, which are equal to or less than an upper limit value, wherein:
   the code data is generated including (i) the symbols corresponding to the respective target data for which the consecutive wrong predictions are made and (ii) a code assigned to the number of the consecutive wrong predictions for the respective target data, in accordance with the table.

8. A non-transitory computer readable medium storing a program causing a computer to execute an encoding process comprising:
   predicting target data;
   judging whether the predicting is right or wrong;
   when it is judged that consecutive predictions for respective target data are wrong, generating coded data that includes a single identifier code that identifies a number of consecutive wrong predictions followed by symbols corresponding to the respective target data for which the consecutive wrong predictions are made; and outputting a table in which different codes are assigned to respective numbers of consecutive predictions judged as wrong, are equal to or less than an upper limit value, wherein:

the code data is generated including (i) the symbols corresponding to the respective target data for which the consecutive wrong predictions are made and (ii) a code assigned to the number of the consecutive wrong predictions for the respective target data, in accordance with the table.

9. The encoder according to claim 1, wherein:
the prediction unit comprises:
    a first prediction section that predicts a data value of the target data using a first prediction method; and
    a second prediction section that predicts the data value of the target data using a second prediction method different from the first prediction method.

10. The encoder according to claim 1, wherein the prediction unit predicts the target data using a run-length coding method.

\* \* \* \* \*